Figure 1:
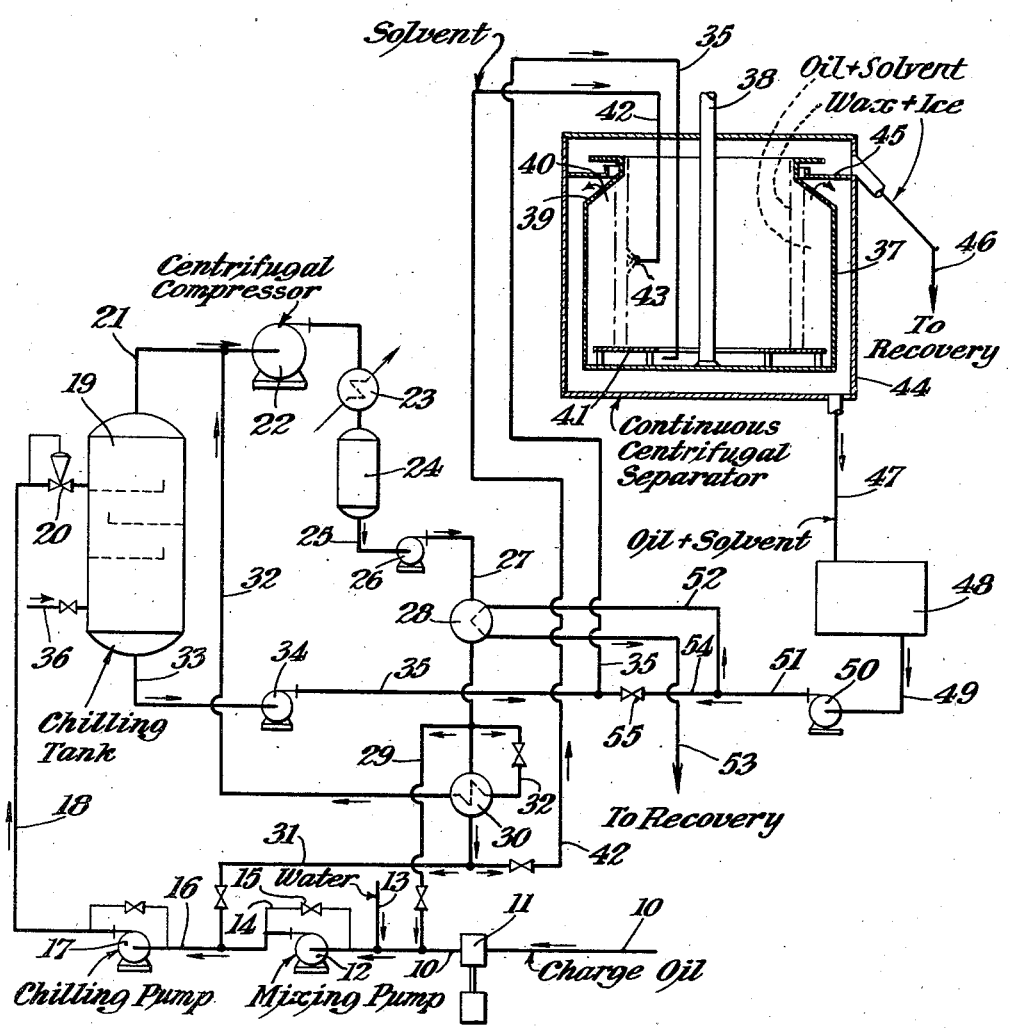

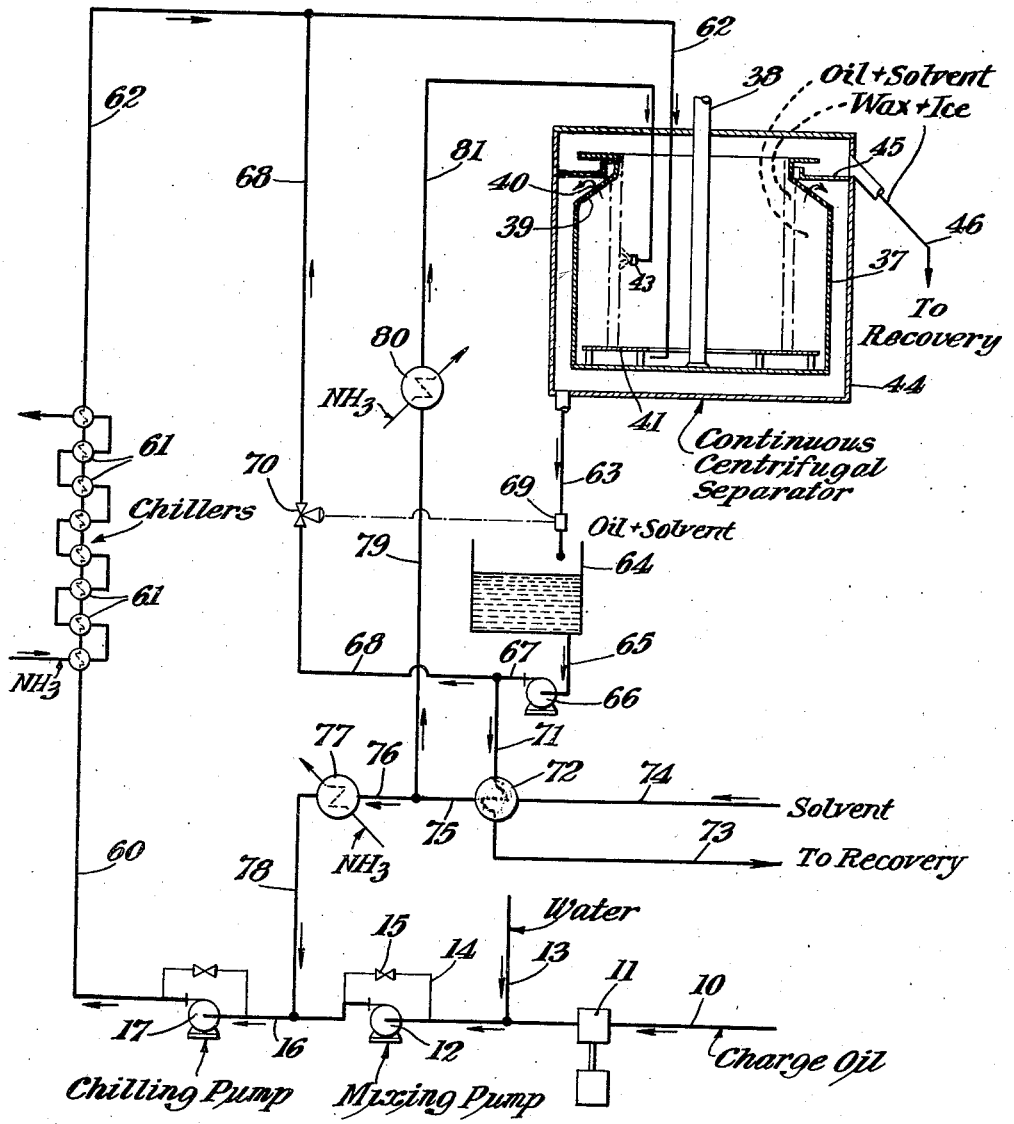

Patented Oct. 21, 1947

2,429,430

UNITED STATES PATENT OFFICE 2,429,430

WAX-OIL SEPARATION

August Henry Schutte, Hastings on Hudson, N. Y.

Application December 2, 1944, Serial No. 566,304

23 Claims. (Cl. 196—18)

This invention relates to improvements in the art of dewaxing oils such as petroleum oils to reduce the pour point thereof. More particularly, the invention relates to improvements in oil-wax separation methods such as those disclosed in my prior patents, Nos. 2,168,140 issued August 1, 1939, 2,168,306 issued August 1, 1939, and 2,325,635 issued August 3, 1943, and the patents to Schutte et al., 2,394,015 issued February 5, 1946 and a division thereof, 2,394,016 issued February 5, 1946.

An important object of the invention is to provide a more efficient method of wax-oil separation.

Another object of the invention is to provide for increased clarification of the oil in the course of its separation from a wax-oil mixture.

Another object of the invention is to provide an improved method wherein an emulsion is formed of a wax-oil mixture, a non-solvent liquid and a specially chosen oil diluent, and wherein the emulsion is chilled to freeze the non-solvent and precipitate the wax in the emulsion, and the emulsion so chilled is subjected to a separating operation so performed as to obtain increased clarification of the oil by the separating action of the frozen non-solvent.

Another object of the invention is to provide, in a satisfactory manner, for direct chilling of the emulsion preparatory to the said separation thereof and thereby effect material economy in the equipment required for the preparation of the emulsion.

Another object of the invention is to provide for such direct chilling by the employment in the emulsion of an oil diluent having a lower boiling point than the other components of the emulsion and by effecting a controlled evaporation of a portion of said diluent to chill the emulsion to the proper degree for precipitation of the wax.

Other objects and advantages of the invention will appear from the following description of preferred forms of embodiment thereof taken in connection with the attached drawings in which:

Fig. 1 is a diagrammatic view of a system suitable for preparing and separating an emulsion having one particularly chosen oil diluent; and Fig. 2 is a view similar to Fig. 1 showing the system modified to adapt it for employment of a different oil diluent.

In the employment of the system shown in Fig. 1, I preferably employ dichlorodifluoromethane, known commercially as "Freon 12," as an oil diluent or solvent in the preparation of the emulsion. This material is chosen because of its suitability for effecting direct chilling of the emulsion, its specific gravity in the liquid state with relation to the other components of the emulsion, its low freezing point, its good oil selectivity and its non-hydrolizing, non-toxic and non-corrosive properties. Another important advantage is that no more than atmospheric pressure is required to maintain this material in liquid state at the proper operating temperature for obtaining separation of the oil and wax.

Water is preferably employed as the non-solvent in the emulsion. However, a suitable organic liquid such as ethyl alcohol, for example, may be used, it being required that the liquid chosen meet the requirements as to freezing point, crystallization and specific gravity. Water is so inexpensive and satisfactory, however, that it will be considered as the non-solvent liquid in the following description of the performance of the process.

In the performance of the process with the said diluent, a charge comprising an oil-wax mixture with the diluent added thereto enters the system through the charge line 10 and is forced by the pump 11 in said line to a mixing device 12. The non-solvent liquid is introduced, by a line 13, into the line 10 at a point between the pump 11 and the mixing device, and the charge containing the non-solvent and the diluent added thereto in predetermined proportions is operated upon by the mixer 12 to obtain an intimate mixture and preferably an emulsion of said components of the charge. The mixer may be an emulsifier or homogenizer of any suitable type but I find that a rotary pump, provided with a by-pass 14 and a relief valve 15, is adequate. A chilled charge of the diluent is also introduced into the line 10, as will be described hereinafter, to effect a pre-chilling of the emulsion.

The emulsion is passed from the mixer 12 through a line 16, and a chilled charge of the diluent is delivered to said line in a manner which will be explained hereinafter. Then, the emulsion containing the added chilled diluent is passed by the line 16 to a second mixer 17, similar to mixer 12, and there re-emulsified with the added diluent. The non-solvent is frozen by the chilled diluent, and the ice crystals or frost particles are distributed throughout the mass of the emulsion by the mixing agitation. A line 18 delivers the emulsion, containing the frozen non-solvent, to a chilling tank 19, and an automatic back pressure valve 20 in said line controls admission of the emulsion to the tank. Within the tank the emulsion cascades over staggered trays and a sufficiently low, regulated pressure is maintained within the tank to obtain a controlled evaporation of a predetermined portion only of the diluent in the emulsion. Thereby, the emulsion is further chilled sufficiently to solidify the wax at least partially and precipitate it within the emulsion.

From the tank 19 the vaporized diluent is passed as overhead by the line 21 and compressed by the compressor 22, which, as indicated, may be of a centrifugal type. The compressed vapor is then passed through a surface condenser 23 and thereby liquefied and passed to a tank 24. A line 25 leading from the bottom of tank 24 conducts the liquefied diluent to a pump 26 and the latter delivers the diluent through a line 27 and an indirect cooler 28 in said line. After passing through the cooler, a portion of the diluent may be passed through a valved line 29 to the charge line 10, at a point between the pump 11 and the first mixer 12, to effect the precooling previously mentioned herein. Another portion of the diluent may be passed through the shell side of a heat exchanger 30 and thence through a valved line 31 to the line 16 at a point between the first and second mixers. Thereby the chilling previously mentioned herein for freezing the non-solvent is obtained. A third portion of the diluent from the cooler 28 may be passed through the tube side of the heat exchanger 30 by a valved line 32 and thence to the overhead line 21 to cool the vaporized diluent prior to the compression thereof.

Emulsion accumulated within the bottom of the chilling tank 19 and containing the unvaporized remainder of the diluent, is delivered by a line 33 to a pump 34 and forced by the latter through a line 35 to a separation zone. A line 36 in delivery connection with the lower portion of the tank 19 serves to supply additional diluent for make-up.

The separation zone comprises a centrifuge preferably of the type disclosed in the aforesaid copending Patents Nos. 2,394,015 and 2,394,016. The centrifuge comprises a solid-bowl separator 37 borne and driven by a rotating axial shaft 38. The circumferential wall of the bowl is imperforate. A solid wall closes one end of the bowl, and the opposite end of the bowl is open and provided with an annular lip 39 turned inwardly from the circumferential wall. The said lip has a circular series of apertures 40 at an intermediate point in the radial width of the lip and concentric with the shaft. A flat circular baffle 41 is mounted in spaced parallel relation to the said solid end wall or bottom of the bowl and with its outer edge spaced from the circumferential wall. The line 35 delivers the emulsion past the inner edge of the baffle for flow between the baffle and the adjacent end wall or bottom of the bowl and thence past the outer edge of the baffle to the separating space between the baffle and the lip 39. A valved line 42 leads from the line 31 to conduct diluent to a spray nozzle 43 located within the separator bowl and directed radially outward for washing a cake of separated wax. A casing 44 encloses the separator bowl and is provided with a trough 45 arranged to receive cake discharged from the bowl and having a wax discharge line 46 leading outwardly from the casing. A discharge line 47 for oil and diluent leads from the bottom of the casing to a closed tank 48.

In the separating operation the chilled emulsion containing the precipitated wax and the frozen non-solvent is delivered by the line 35 to the under side of the baffle 41 and directed by the latter to the circumferential wall of the rotating bowl. Within the separating space between the baffle and the bowl lip 39 centrifugal force causes a solution of the oil and the diluent to settle within the space next to the circumferential wall and causes the wax to float radially inwardly and form an inner stratum or cake of separated wax. The frozen non-solvent, having a specific gravity intermediate the specific gravity of said solution and that of the wax, also floats inwardly to separate from the heavier solution, and the frost particles or crystals become closely associated with the wax and many of them become mixed therewith. The wax cake is discharged axially from the bowl past the inner edge of the lip 39 and is discharged into the trough 45 and conducted from the casing by the line 46. This line may lead to suitable recovery means, not shown, for the recovery of any diluent remaining within the wax and for separation of the non-solvent from the wax. The oil and diluent solution is continuously discharged from the bowl through the lip apertures 40 and into the casing whence it is withdrawn through the line 47 to the tank 48.

Discharge of the solution of oil and diluent from the separator bowl is regulated to retain within the bowl a desired radial depth of the solution of oil and diluent and a desired radial location of the wax cake. Such regulation of the discharge is obtained approximately by choice of size and number of the discharge apertures 40 with relation to the rate of emulsion feed to the bowl and with relation to the rotational speed of the bowl, and the apertures are radially located to avoid discharge therethrough of the wax and the frozen non-solvent. Provision is also made for more accurate radial positioning of the interface of the separated wax and the solution than can be had by said choice of the size, number and location of the apertures and for maintaining a desired position of the interface regardless of fluctuations in the rate of emulsion feed and in the rotational speed of the bowl.

A line 49 conducts oil and diluent solution from the tank 48 to a pump 50 and the latter forces the solution through a line 51 and a connected line 52. The latter line passes the solution through the tube side of the cooler 28 for cooling the diluent delivered by the pump 26. Thence the solution is discharged through a line 53 to suitable recovery means (not shown) for recovery of the diluent from the oil. Another line 54, also leads from the line 51 to the line 35 which feeds the emulsion to the separation zone. The line 54 has a valve 55. By manipulation of the valve 55 the supply of solution to the emulsion feed line 35 may be controlled to regulate said depth of the solution in the bowl and thereby regulate the position of the interface of the solution and the cake. Alternatively, the valve in the feed line 42 for the wash diluent may be manipulated to govern the amount of diluent delivered to the separator and thereby control the position of the cake.

Heretofore, oil-wax separation operations by centrifuging have been deficient in obtaining adequate separation. That has been due to the employment of relatively small centrifuges and the operation thereof at extremely high rotational speeds with consequent low hold-up volume and inadequate residence time of the materials within the separation zone. Under those circumstances there is not sufficient time for drainage of the wax cake and for adequate separation, nor is there space for accumulation of a cake of adequate thickness. Owing to the thinness of the cake it is impossible to insure discharge of an adequately dry cake. For example, centrifuge rotors of from 4 to 24 inches diameter have been operated at from 5,000 to 10,000 gravities and with a short settling time within the range 0.5 to 10 seconds. Separators capable of withstanding the centrifugal force of such high speed operation are moreover quite expensive.

My improved method enables more satisfactory performance of the separation with the employment of a relatively large centrifuge rotor of a diameter ranging from 60 to 80 inches, or over, operated at from 400 to 800 gravities, with a greatly increased settling time ranging from 20 to 100 seconds and with maintenance of a liquid stratum of from 6 to 8 inches radial depth, with a lip 39 of sufficient radial extent. The cake-draining time will then be many times that afforded by operation of conventional centrifuges and there will be obtained a porous, free-draining wax cake which can be throughly washed. A substantial thickness (¼" to 1") of thoroughly drained and washed solids can be obtained at the cake exit point and the floating drained solids layer can be removed without removing the submerged solids along with the drained cake. In the manner previously described herein the interface of the submerged solids and the solution is kept at a position inward of the apertures 40 to prevent discharge of the solids there also. Another advantage is that such a centrifuge, owing to the relatively slow speed of operation required, can be made at a greatly reduced cost for a given output capacity.

The advantages stated are provided by my process set forth and more particularly by the character of the diluent employed and the employment of the non-solvent in a frozen state in the separation step of the process. The diluent has the relatively high specific gravity of 1.41 and also has good oil selectivity so that the solution of oil and diluent settles to form the outer layer within the centrifuge bowl. The wax, having the lowest specific gravity of the emulsion components, forms the inner layer, and the frozen non-solvent, having a specific gravity intermediate the specific gravity of the solution and that of the wax, follows the wax in the order of separation from the solution. Most desirable results are obtained by the employment of the non-solvent in a frozen state and by the maintenance of a substantial residence time of the materials within the centrifuge. A more free-draining wax cake and improved clarification of the oil are obtained. The frost particles or ice crystals of the non-solvent closely follow the wax in separating from the solution and become closely associated or mixed with the submerged portion of the wax cake which portion is subsequently advanced to unsubmerged position as the wax discharge progresses. The incorporation of these crystals within the wax mass renders the latter porous and free draining. Drainage of the cake within the centrifuge is also assisted by the maintenance of substantial residence time and by the radially deep accumulation of both the solution and the wax cake within the centrifuge. Discharge of an adequately dry cake is also assisted since the substantial thickness of the cake facilitates a clean separation of the dry portion of the cake from the submerged portion thereof in the discharge of the wax from the bowl.

In addition to their function of producing a more porous wax cake the ice crystals function to clarify the oil. In the course of separation, as the crystals float inwardly through the oil and diluent solution, on their way to the wax cake, they comb cloud-forming particles from the solution and function in effect as a floating filter aid. This is a most desirable feature of the process.

In the operation of the system it is desirable to maintain a temperature of approximately −25° F. within the lower portion of the chilling tank 19 and within the separator bowl 37. It is desirable also that the charge delivered to the separator contain the diluent and the oil-wax mixture in an approximate proportion of three parts diluent to one part of said mixture by volume, the introduction of the diluent into the system being controlled to obtain approximately that proportion. It is also desirable that the introduction of the water by the line 13 be controlled to obtain a proportion, by volume, of one part water to one part of the wax which is to be removed from the mixture introduced by the line 10.

In the employment of the system shown in Fig. 2 I preferably employ monochloro-benzene as the oil diluent or solvent. This diluent possesses the advantages of the first-mentioned diluent with the exception that its employment requires provision for indirect cooling to effect precipitation of the wax and freezing of the non-solvent. It is, however, cheaper than the first-mentioned diluent.

In Fig. 2 parts of the system similar to parts in Fig. 1 are designated by corresponding reference characters. In the operation of the system the oil-wax charge with the added diluent is introduced by the line 10 and the pump 11. The non-solvent liquid (water in the present instance) is added to the charge by the line 13 and the charge is emulsified by the mixers 12 and 17. A line 60 conducts the emulsion to a battery of indirect heat exchangers 61 connected in series. The heat exchangers may be of a standard double-pipe type and may employ ammonia or other suitable refrigerant for chilling. The emulsion is passed through the heat exchangers in series to effect precipitation of the wax in the emulsion. The emulsion so chilled is then passed through the line 62 to the centrifuge bowl 37 and discharged beneath the baffle 41. The separating operation is performed in a manner precisely like that previously described herein in connection with Fig. 1.

Separated oil and diluent solution is discharged from the centrifuge casing through a line 63 to a tank 64. From the latter the solution is passed by a connection 65 to a pump 66. From the delivery line 67 of this pump a portion of the solution is passed through a line 68 to the emulsion feed line 62. The delivery through line 68 is automatically controlled by a flow responsive device 69 of any suitable type associated with the line 63 and operatively connected to a valve 70 in the line 68 to control flow through the latter in response to flow in the line 63. By such means controlled admission of additional diluent to the separator is had for control of the radial position of the interface of the solution and the separated wax, as described in connection with Fig. 1. Another portion of the solution delivered by the pump 66 is passed from the line 67 to a line 71 and by the latter to the tube side of a heat exchanger 72 and thence, by a line 73, to a recovery zone (not shown). A line 74 from the recovery zone passes the recovered diluent through the shell side of the heat exchanger 72 to cool the diluent. The chilled diluent is passed from the heat exchanger 72 by a line 75. From said line a portion of the diluent is passed by a line 76 to an ammonia chiller 77 for further cooling and then delivered by a line 78 to the line 16 to freeze the non-solvent within the second emulsification stage. Another portion of the recovered diluent is passed from the line 75 through a line 79 to an ammonia chiller 80, for further cooling, and thence passed through a line 81 to the wash spray nozzle 43 within the centrifuge.

It is desirable that the emulsion be delivered from the chillers 61 to the centrifuge at a temperature of approximately —10° F. The proportion of diluent to oil-wax mixture and the proportion of water to the wax which is to be removed from the mixture may be the same as the proportions previously given herein in connection with the system shown in Fig. 1.

In both systems the performance of all steps of the process, from the introduction of the charge to the discharge of the separated products, inclusive, is continuous.

While I have disclosed preferred forms of embodiment of my invention, I am aware that modifications may be made therein and I therefore desire a broad interpretation thereof within the scope and spirit of the description herein and of the claims appended hereto.

Having thus fully described my invention, what I claim as new and desire to secure by Letters Patent is:

1. The method of separating an oil-wax mixture, comprising emulsifying said mixture with a non-solvent liquid having a freezing point above the pour point of the wax-free oil and having a crystal formation when frozen, and an oil-selective diluent in a liquid state, of greater specific gravity than the wax of the mixture and heavier than the frozen non-solvent and having a lower freezing point than the non-solvent, chilling the resulting emulsion to freeze said non-solvent liquid and precipitate the wax in the emulsion while retaining the solution of oil and diluent in liquid state, centrifuging the emulsion so chilled to separate the wax from the solution of oil and diluent and form annular concentric strata including an inner stratum of separated wax and crystals of the frozen non-solvent, and an outer stratum comprising said solution, and maintaining said outer stratum relatively deep radially during the centrifuging step and thereby maintaining sufficient residence time of the materials within said centrifuging step for separation of the frozen non-solvent from the oil and diluent solution and combing of cloud-forming particles from the solution by the crystals of frozen non-solvent in the passage thereof radially inward from the solution.

2. The method of separating an oil-wax mixture, comprising emulsifying said mixture with water and an oil-selective diluent in a liquid state and heavier than the wax of the mixture and heavier than the water in a frozen state and having a lower freezing point than the water, chilling the resulting emulsion to freeze the water and precipitate the wax in the emulsion while retaining the solution of oil and diluent in liquid state, centrifuging the emulsion so chilled to separate the wax from the solution of oil and diluent and form annular concentric strata including an inner stratum of separated wax and ice crystals and an outer stratum comprising said solution, and maintaining said outer stratum relatively deep radially during the centrifuging step and thereby maintaining sufficient residence time of the materials within said centrifuging step for separation of the frozen water from the oil and diluent solution and combing of cloud-forming particles from the solution by the ice crystals in the passage thereof radially inward from the solution.

3. The method of separating an oil-wax mixture, comprising emulsifying said mixture with a non-solvent liquid having a freezing point above the pour point of the wax-free oil and having a crystal formation when frozen, and an oil-selective diluent in a liquid state, of greater specific gravity than the wax of the mixture and the frozen non-solvent and having a lower freezing point than the non-solvent, chilling the resulting emulsion to freeze said non-solvent liquid and precipitate the wax in the emulsion while retaining the solution of oil and diluent in liquid state, subjecting the emulsion so chilled to a settling operation to separate the wax from the solution of oil and diluent and form a stratum of separated wax and crystals of the frozen non-solvent and a stratum comprising said solution, and maintaining the latter stratum relatively deep and thereby maintaining sufficient residence time of the materials in said settling operation for separation of the frozen non-solvent from the oil and diluent solution and combing of cloud-forming particles from the solution by the crystals of frozen non-solvent in the passage thereof from the solution to said wax-containing stratum.

4. The method of continuously separating an oil-wax mixture, comprising continuously emulsifying said mixture with a non-solvent liquid having a freezing point above the pour point of the wax-free oil and having a crystal formation when frozen, and an oil-selective diluent in a liquid state, of greater specific gravity than the wax and the frozen non-solvent and having a lower freezing point than the non-solvent, chilling the resulting emulsion to freeze said non-solvent liquid and precipitate the wax in the emulsion while retaining the solution of oil and diluent in liquid state, continuously centrifuging the emulsion so chilled to separate the wax from the solution of oil and diluent and form annular concentric strata including an inner stratum of separated wax and crystals of the frozen non-solvent and an outer stratum comprising said solution, discharging wax and ice crystals from the said inner stratum during the centrifuging operation, discharging oil and diluent solution from said outer stratum during the centrifuging operation, and regulating said discharge of the solution to maintain said outer stratum relatively deep radially during the centrifuging operation and thereby maintaining sufficient residence time of the materials within said centrifuging step for separation of the frozen non-solvent from the oil and diluent solution and combing of cloud-forming particles from the solution by the crystals of frozen non-solvent in the passage thereof radially inward from the solution.

5. The method claimed in claim 4 and including effecting the said discharge of the oil-diluent solution axially from a point spaced radially outward from the separated wax, effecting the said discharge of the separated wax and associated crystals of the frozen non-solvent axially from a point spaced radially inward from said point of discharge of the solution, introducing to the centrifuging step additional liquid heavier than the frozen non-solvent, and controlling introduction of said additional liquid to adjust the radial position of the wax stratum, for the purpose set forth.

6. The method of separating an oil-wax mixture, comprising emulsifying said mixture with water and an oil diluent comprising dichlorodifluoromethane in a liquid state, chilling the resulting emulsion to freeze the water therein, further chilling the emulsion by evaporation of a portion of said diluent to precipitate the wax in the emulsion while retaining the solution of oil and diluent in liquid state, centrifuging the emulsion so chilled to separate the wax from the solution of oil and diluent, and maintaining sufficient residence time of the materials within said centrifuging step for separation of the ice crystals from the oil-diluent solution and thereby combing cloud-forming particles from the solution by the ice crystals in the passage thereof from the solution.

7. The method of separating an oil-wax mixture, as claimed in claim 3 and wherein water is employed as the non-solvent liquid.

8. The method of separating an oil-wax charge mixture, as claimed in claim 3 and wherein the said diluent comprises monochloro-benzene.

9. The method of continuously separating an oil-wax mixture, comprising adding to said mixture and mixing therewith a non-solvent liquid having a freezing point above the pour point of the wax-free oil and having a crystal formation when frozen, and an oil-selective diluent in a liquid state, of greater specific gravity than the wax and the frozen non-solvent and having a lower freezing point than the non-solvent, chilling the mixture with the added non-solvent and the diluent, to freeze said non-solvent liquid and precipitate the wax in the emulsion while retaining the solution of oil and diluent in liquid state, continuously charging the mixture so chilled into a centrifuging zone and therein continuously centrifuging the mixture to separate the wax from the solution of oil and diluent and form annular concentric strata including an inner stratum of wax and crystals of the frozen non-solvent and an outer stratum comprising said solution, discharging wax and ice crystals from the said inner stratum during the centrifuging operation, discharging oil-and-diluent solution from said outer stratum during the centrifuging operation, and regulating said discharge of the solution to maintain said outer stratum relatively deep radially during the centrifuging operation and thereby maintaining sufficient residence time of the materials within the centrifuging zone for separation of the frozen non-solvent from the oil-and-diluent solution and combing of cloud-forming particles from the solution by the crystals of frozen non-solvent in the passage thereof radially inward from the solution.

10. The method of separating an oil-wax mixture, as claimed in claim 9, wherein water is employed as the non-solvent liquid, and wherein said mixture is emulsified in the said mixing step with the water and the diluent.

11. The method of separating an oil-wax mixture, as claimed in claim 9, wherein water is employed as the non-solvent liquid, monochlorobenzene is employed as the diluent, and the oil-wax mixture is emulsified in the said mixing step with the non-solvent liquid and the diluent.

12. The method of separating oil and wax, comprising centrifuging a chilled mixture of the oil and wax together with crystals of a frozen non-solvent liquid and an oil diluent in liquid state and of greater specific gravity than the frozen non-solvent, the wax being precipitated within the mixture and the crystals of frozen non-solvent being distributed throughout the mixture, forming, by said centrifuging step, annular concentric strata including an inner stratum of wax and crystals of the frozen non-solvent and an outer stratum comprising a solution of the oil and diluent, and maintaining a substantial radial depth of said outer stratum and thereby maintaining sufficient residence time of the materials within the centrifuging step for separation of the frozen non-solvent from the oil and diluent solution and combing of cloud-forming particles from the solution by the crystals of frozen non-solvent in the passage thereof radially inward from the solution.

13. The method of separating oil and wax as claimed in claim 12, wherein monochlorobenzene is employed as the diluent.

14. The method of separating oil and wax as claimed in claim 12, wherein dichlorodifluoromethane is employed as the diluent.

15. The method of separating oil and wax, comprising subjecting to a settling operation a chilled mixture of the oil and wax together with crystals of a frozen non-solvent liquid and an oil diluent in liquid state and of greater specific gravity than the frozen non-solvent, the wax being precipitated within the mixture and the crystals of frozen non-solvent being distributed throughout the mixture, forming, by the settling operation, a stratum of separated wax and crystals of the frozen non-solvent and a stratum comprising a solution of the oil and said diluent, and maintaining a substantial depth of the stratum of said solution and thereby maintaining sufficient residence time of the materials in the settling operation for separation of the frozen non-solvent from said solution and combing of cloud-forming particles from the solution by the crystals of frozen non-solvent in the passage thereof from the solution.

16. The method of separating oil and wax as claimed in claim 15, wherein water is employed as the non-solvent liquid, and monochlorobenzene is employed as the diluent.

17. The method of separating oil and wax as claimed in claim 15, wherein the diluent employed comprises monochlorobenzene.

18. The method of separating a mixture containing a liquid component comprising oil and a solid component lighter than said liquid component and comprising wax, comprising centrifuging the mixture to separate the solid component as an inner stratum and the liquid component as an outer stratum, discharging the separated liquid component from said outer stratum at a point spaced radially outward from the axis, discharging the separated solid component from said inner stratum at a point spaced radially inward from said point of discharge of the liquid component, recycling to the centrifuging step a portion of the liquid component so discharged, and controlling said recycle in response to fluctuations in said discharge to maintain the radial position of the interface of said strata between the said points of discharge.

19. The method of separating a mixture containing a liquid component comprising oil and a solid component lighter than said liquid component and comprising wax, comprising centrifuging the mixture to separate the solid component as an inner stratum and the liquid component as an outer stratum, discharging the separated liquid component from said outer stratum at a point spaced radially outward from the axis, discharging the separated solid component from said inner stratum at a point spaced radially inward from said point of discharge of the liquid component, recycling to the centrifuging step a portion of the liquid component so discharged, and controlling said recycle to maintain the radial position of the interface of said strata between the said points of discharge.

20. The method claimed in claim 4 and including effecting the said discharge of the oil-diluent solution from a point spaced radially outward from the axis, effecting the said discharge of the separated wax and associated crystals of the frozen non-solvent from a point spaced radially inward from said point of discharge of the solution, recycling to the centrifuging step separated oil and diluent solution discharged from said step, and controlling said recycle to maintain the radial position of the interface of said strata between the said discharge points.

21. The method claimed in claim 12 and including effecting discharge of the oil-diluent solution from a point spaced radially outward from the axis, effecting discharge of the separated wax and associated crystals of the frozen non-solvent from a point spaced radially inward from said point of discharge of the solution, and maintaining the radial position of the interface of the said strata between said points of discharge by controlled admission of additional liquid of greater specific gravity than the frozen non-solvent.

22. The method of separating oil and wax as claimed in claim 15, wherein the diluent employed comprises dichlorodifluoromethane.

23. The method of separating oil and wax as claimed in claim 15, wherein water is employed as the non-solvent liquid and dichlorodifluoromethane is employed as the diluent.

AUGUST HENRY SCHUTTE.

REFERENCES CITED

The following references are of record in the file of this patent:

UNITED STATES PATENTS

| Number | Name | Date |
|---|---|---|
| 2,164,013 | Jenkins I | June 27, 1939 |
| 2,168,140 | Schutte I | Aug. 1, 1939 |
| 2,205,096 | Jenkins II | June 18, 1940 |
| 2,234,916 | Jones I | Mar. 11, 1941 |
| 2,263,535 | Carr et al. | Nov. 18, 1941 |
| 2,296,456 | Schutte II | Sept. 22, 1942 |
| 299,611 | Baker | June 3, 1884 |
| 1,170,052 | Voorhees | July 8, 1930 |
| 1,988,712 | Bray et al. | Jan. 22, 1935 |
| 2,129,752 | Whiteley | Sept. 13, 1938 |
| 2,140,485 | Terres et al. | Dec. 13, 1938 |
| 2,223,939 | Jones | Dec. 3, 1940 |
| 2,342,798 | Fischer | Feb. 29, 1944 |